No. 861,298. PATENTED JULY 30, 1907.
T. J. LINDSAY.
FRICTION BRAKE FOR VEHICLES.
APPLICATION FILED JUNE 15, 1905.
2 SHEETS—SHEET 1.
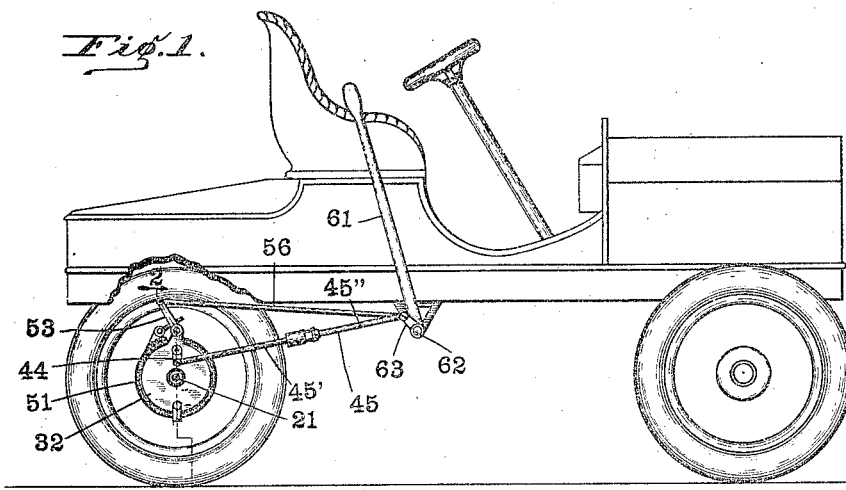
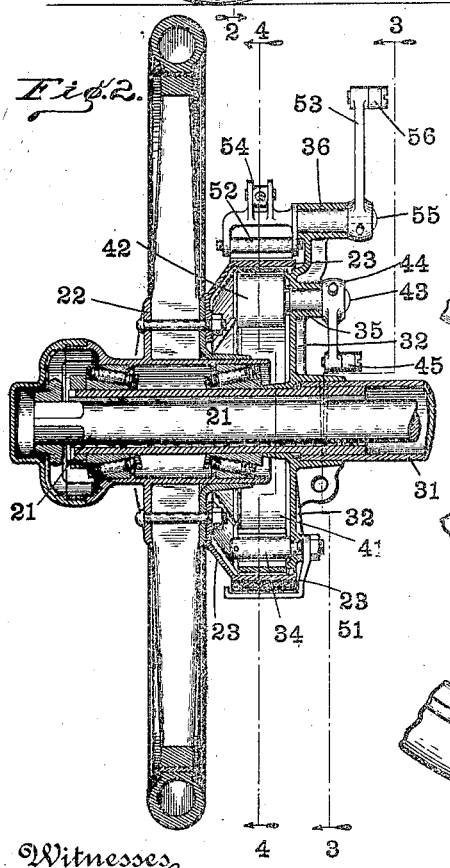
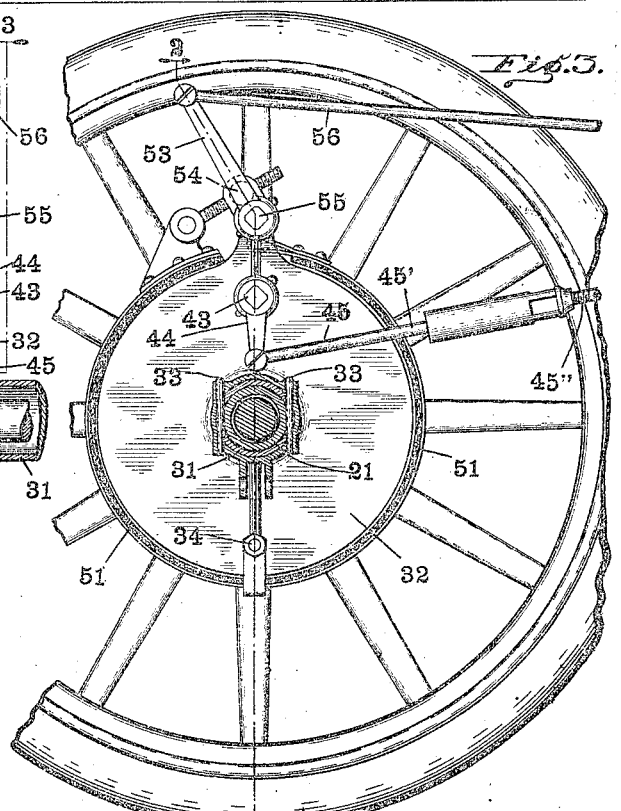
Witnesses
Frank A. Sahle
J. A. Walsh
Inventor
Thomas J. Lindsay
By Bradford & Hood
Attorneys No. 861,298. PATENTED JULY 30, 1907.
T. J. LINDSAY.
FRICTION BRAKE FOR VEHICLES.
APPLICATION FILED JUNE 15, 1905.
2 SHEETS—SHEET 2.
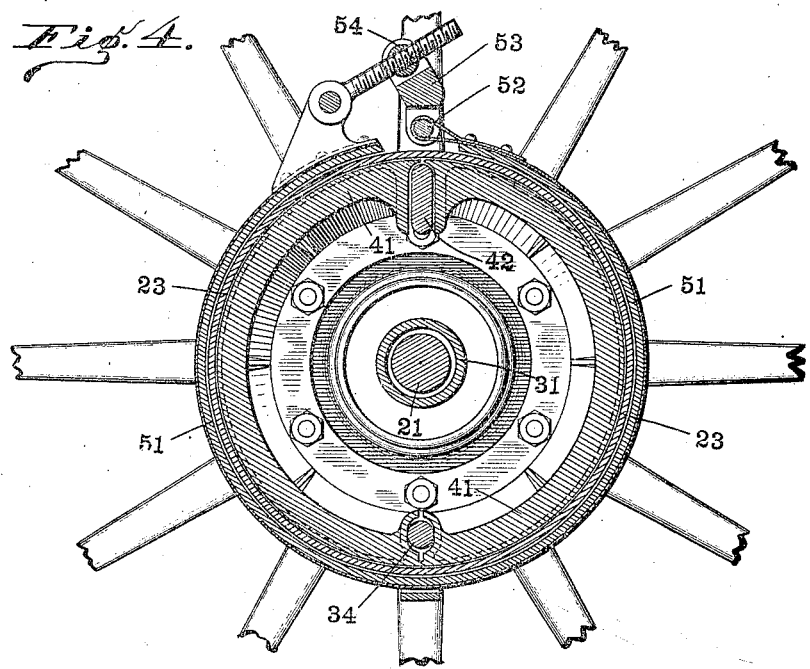
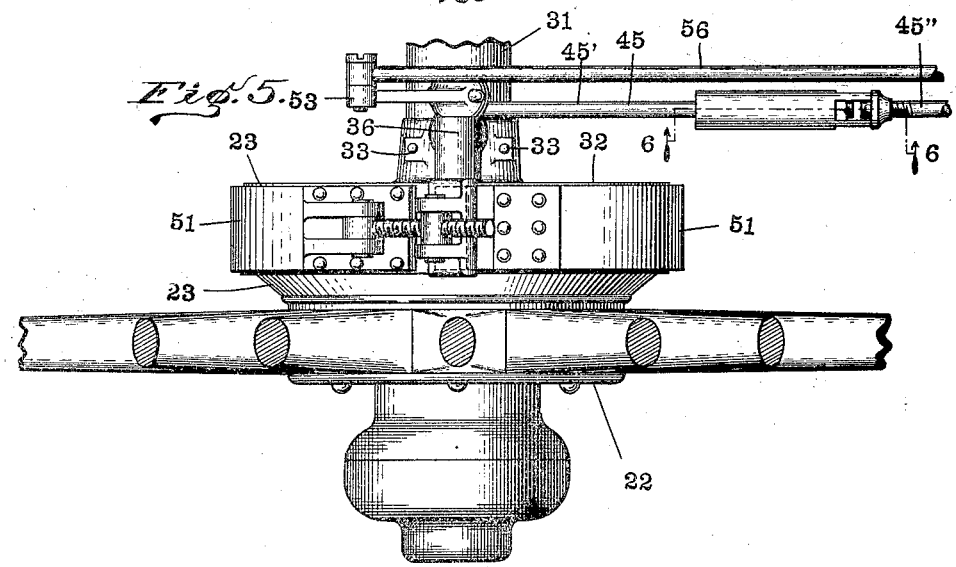
Witnesses
Inventor
Thomas J. Lindsay
By Bradford & Hood,
Attorneys

UNITED STATES PATENT OFFICE.

THOMAS J. LINDSAY, OF INDIANAPOLIS, INDIANA.

FRICTION-BRAKE FOR VEHICLES.

No. 861,298.  Specification of Letters Patent.  Patented July 30, 1907.

Application filed June 15, 1905. Serial No. 265,341.

*To all whom it may concern:*

Be it known that I, THOMAS J. LINDSAY, a citizen of the United States, residing at Indianapolis, in the county of Marion and State of Indiana, have invented certain new and useful Improvements in Friction-Brakes for Vehicles, of which the following is a specification.

The principal object of my invention is to provide a powerful and easily operated brake for vehicles, the same being especially designed to be used with motor vehicles.

Referring to the accompanying drawings, which are made a part hereof, and on which similar reference characters indicate similar parts, Figure 1 is a side elevation of a motor vehicle with a portion broken away thus showing the inner side of a brake attached to the farther wheel embodying my improvements; Fig. 2 a vertical sectional view taken longitudinally of the axle at the point indicated by the dotted line 2 2 in Figs. 1 and 3; Fig. 3 a transverse sectional elevation as seen when looking in the direction indicated by the arrows from the point indicated by the dotted line 3 3 in Fig. 2; Fig. 4 a transverse sectional view as seen when looking in the direction indicated by the arrows from the point indicated by the dotted line 4 4 in Fig. 2; Fig. 5 a detail top or plan view of my improved brake in connection with the other wheel from that shown in the previously-described views, and Fig. 6 a detail sectional view at the point indicated by the dotted line 6 6 in Fig. 5.

Upon the axle 21 the wheel hub 22 is mounted in any desired manner. To this wheel I secure the brake rim 23; the same being an annular rim, turned true both inside and out. Upon the sheath or casing 31 which surrounds the axle 21 I place the support 32 for the brake-operating mechanism. This is firmly attached, as by means of pins 33. Said pins (see Fig. 3) are preferably taper pins, and intersect adjacent portions of the axle structure and the hub of the wheel support, and unite them strongly and firmly without brazing or screwing them together. This support 32 carries a stud 34 for holding the inner brake in place, and bearings 35 and 36, the former of which carries the inner brake operating arm and the latter of which carries the outer brake-operating arm.

The inner brake 41, as best shown in Fig. 4, is in the form of a split ring. It is held from revolving (principally) by means of the stud 34. The split is at the opposite side of the ring from this stud, and at this point there are two opposing faces between which is a cam 42, the stem 43 of which extends out through the bearing 35 and has upon its outer end the brake arm 44. A suitable link 45 extends forward to the brake lever, which is situated conveniently to the operator. Obviously by pressing upon this brake lever the cam 42 is rocked in its bearing and forced against the adjacent faces on the inner brake 41, spreading the ring of which said brake is composed until it comes forcibly into contact with the inner surface of the brake ring 23.

The outer brake 51 is a strap brake, one end of which is connected at 52 to the inner end of the arm 53, and the other end of which is connected at 54 to the same arm—the pivot point being between these two points of connection and consisting of the rock pin 55 which is mounted in the bearing 36, as shown. A link 56 runs back to a point convenient to the operator, where it is connected to a suitable brake operating lever. Both links may, if desired, be connected to the same brake operating lever, so that the operator is able to apply pressure through one lever to both the interior and exterior of the brake rim 23, thus producing multiplied frictional force; or, the two can be detached and used independently, so that either or both can be used if desired. The means which I have chosen to employ to operate these brakes consists, in detail, of an ordinary brake-operating lever 61 mounted on a rock-shaft 62, and carrying an arm 63 to which the links 45 and 56 are connected. The link 45 consists of two members 45′ and 45″, and these are united by a spring connection, the compression spring 46 being interposed between suitable parts carried by the ends of these link members. In operation, these parts are so adjusted that the inner brake will come into contact with the brake rim first. A continuation of the movement of the brake-lever 61 will compress the spring 46 somewhat, and the outer brake will then come into contact with the brake rim. This spring 46 provides the necessary elasticity to enable both brakes to work uniformly, notwithstanding some slight lost motion which may exist in the various joints. It also enables the operator to apply the inner brake only when only a comparatively small braking force is desired; and then, at any time, if more braking force is necessary, to apply it by simply carrying forward the same movement on the same brake lever.

Having thus fully described my said invention, what I claim as new, and desire to secure by Letters Patent, is,—

1. The combination of an annular brake rim, an internal brake, an external brake, a single brake-lever, connections running from each of said brakes to said brake lever, and an elastic member in one of said connections.

2. The combination of an annular brake rim, an internal brake, an external brake, a single means for applying both said brakes at the same time, and separate connections connecting said means and said brakes, one of said connections being more resilient than the other whereby the brakes are enabled to be applied successively.

3. The combination of a single brake operating lever, an annular brake rim, an internal brake arranged to engage with said brake rim, a connection running from said brake to said single lever, an external brake arranged to engage with said brake rim, and a connection running from said brake to said single lever.

4. The combination of a single brake operating lever, an annular brake rim, an internal brake, a support for the brake-operating devices, a separate brake operating device for said internal brake mounted on said support, a separate connection extending from said device to said single brake operating lever, an external brake, a separate brake-operating device for said external brake mounted on said support, and a separate connection extending from said device to said single brake-operating lever.

5. The combination of a wheel, an annular brake rim secured to said wheel, a support for brake-operating means mounted upon the stationary axle structure alongside the rim and brakes, two brake-operating devices for the brakes mounted upon said support, an internal brake, an external brake, and a simultaneously-operating apparatus for both said brake-operating devices.

6. The combination, in a motor vehicle, of the driving axle, a wheel on said axle, an annular brake rim secured to said wheel, an internal brake, an external brake, both of said brakes being substantially concentric with said rim, a support for brake-operating means mounted upon the axle casing alongside said rim and said brakes, a brake operating device for each of said brakes mounted on said support, and a single lever to which both said brake operating devices are connected.

7. The combination, in a vehicle, of a support for the brake operating mechanism, the axle structure, and pins 3 3 entering perforations in said support and engaging with notches in the sides of said axle structure, thus uniting said support and structure.

In witness whereof, I, have hereunto set my hand and seal at Indianapolis, Indiana, this 23d day of May, A. D. one thousand nine hundred and five.

THOMAS J. LINDSAY. [L. S.]

Witnesses:
CHESTER BRADFORD,
JAMES A. WALSH.